United States Patent

Nakajima et al.

[11] Patent Number: 5,900,052
[45] Date of Patent: May 4, 1999

[54] BELT COATING MATERIAL FOR BELT TYPE CONTINUOUS CASTING AND BELT COATING METHOD

[75] Inventors: Hiroshi Nakajima; Kouichi Hirata; Hironori Fujioka, all of Hiroshima-ken, Japan

[73] Assignee: Mitsubishi Heavy Industries, Ltd., Tokyo, Japan

[21] Appl. No.: 08/834,474

[22] Filed: Apr. 11, 1997

[30] Foreign Application Priority Data

Apr. 23, 1996 [JP] Japan ..................... 8-101016

[51] Int. Cl.⁶ ..................... C03C 08/14
[52] U.S. Cl. ............... 106/626; 501/17; 501/32; 501/57; 501/70; 501/72; 501/151
[58] Field of Search .............. 106/626; 501/11, 501/17, 32, 57, 70, 72, 151

[56] References Cited

FOREIGN PATENT DOCUMENTS 06116408  8/1994  Japan .

*Primary Examiner*—Paul Marcantoni
*Attorney, Agent, or Firm*—Bell Seltzer Intellectual Property Law Group of Alston & Bird LLP

[57] ABSTRACT

There is provided a belt coating material for a belt type continuous casting, which is capable of adsorbing the intermediate between a cast slab and the coating material to prevent the intermediate from remaining on the slab, and reducing the averaged heat flux during the casting to avoid an occurrence of cracking in a medium carbon steel. The belt coating material comprises: (1) a powder having a composition comprising 10 to 40 weight % of $SiO_2$, 1 to 10 weight % of $Al_2O_3$, 10 to 40 weight % of CaO, 10 to 30 weight % of $Na_2O$, 1 to 10 weight % of MgO, 10 to 20 weight % of F, and 1 to 5 weight % of $LiO_2$, the powder being prepared by once melting the blended components, solidifying the melt, and crushing it into the powder to adjust the average grain diameter of the powder to be equal to or smaller than 10 μm; (2) 0.1 to 10 weight % of graphite mixed into the powder to provide a mixture, the graphite having the same grain diameter with the powder; and (3) 0.5 to 10 weight % of water glass, a viscosity increasing material, and water, each being added into the mixture so as to adjust the viscosity of the material to a predetermined value.

4 Claims, 3 Drawing Sheets

BELT COATING MATERIAL FOR BELT TYPE CONTINUOUS CASTING AND BELT COATING METHOD

BACKGROUND OF THE INVENTION

1. Field of the Invention

The present invention generally relates to a belt coating material which is applied onto a molding part belt of a belt type continuous casting device, and a method for coating the material onto the belt.

2. Description of the Related Art

With respect to FIGS. 2 and 3, the general construction and operation of a conventional belt-type continuous casting device is explained below. In FIG. 2, the device has a tundish 28, a nozzle 27 at the lower part of tundish 28, a pair of endless belts 21 facing each other and rotating in the opposite directions, and a pair of side dams 23 each comprising a series of combined small copper blocks which rotate together with the belts 21, with dams 23 being clamped between the lateral ends of each belt 21, respectively. The molten steel 30 within the tundish 28 is supplied from the nozzle 27 into a rectangular parallelepiped casting space which is defined by the belts 21 and the side dams 23. The belts 21 and dams 23 are moved at the same speed, and a cast slab 33 having a solidified shell 32 is produced.

FIG. 3 shows a means or mechanism for supplying a coating material onto the surfaces of moving belts 21, in a belt type continuous casting device such as noted above. The pair of metal belts 21 are wound onto pulleys 22, and a molding portion 20 of the casting space is defined by the belts 21 and side dams 23.

Coating devices 24 are disposed above the belts 21, such that the gaps "g" are defined between the tip portions of coating nozzles 25 of these devices and the surfaces of belts 21. Induction heating coils 26 are disposed to face each surface of the ascending portions of belts 21, respectively.

The composition of coating material 41 is described, for example, in Japanese Patent Laid-Open Publication No. HEI-6-226,408. Namely, the material is provided in a slurry state, in which the graphite concentration in the matrix is greater than 20% (preferably, greater than 30%), the concentration "C" of solids in the slurry satisfies $C \leq 75-0.4x$ (where "x" is the graphite concentration in the matrix), the graphite grains are crystalline and have diameters of 50 $\mu$m to 500 $\mu$m, and the remainder comprises zircon. The coating devices 24 contain such a slurry of coating material.

The coating material 41 is applied onto the belts 21 by the coating nozzles 25 at a predetermined thickness t, while rotating the belts 21, pulleys 22 and side dams 23. The belts 21 and coating material 41 are heated to be dried at a temperature of 120° C. by the induction heating coils 26, and then fed into the molding part 20, followed by the continuous supply of the molten steel 30 from the tundish 28 via injection nozzle 27 into molding portion 20. The cast slab 33 is discharged downward having the solidified shell 32 formed by cooling.

The conventional coating material may not melt even when it comes into contact with the molten steel 30 supplied into the molding portion 20, and an interstitial material (consisting mainly of alumina), which has entered between the cast slab and coating material, is not adsorbed anywhere and remains disadvantageously on the surfaces of the slab.

SUMMARY OF THE INVENTION

Accordingly, it is an object of the present invention to solve the aforementioned problems in the conventional techniques, by providing a belt coating material for belt-type continuous casting and a belt coating method in which the coating material contains graphite powder which does not react with the oxides powder to be vitrified and does not cause problems even upon contact with the molten steel, such that the interstitial material is adsorbed, the average heat flux during casting is reduced, and the cracking of medium carbon steel is avoided.

In order achieve the object, the present invention provides a belt coating material for a belt-type continuous casting, comprising a powder having a composition comprising 10 to 40 weight % of $SiO_2$; 1 to 10 weight % of $Al_2O_3$; 10 to 40 weight % of CaO; 10 to 30 weight % of $Na_2O$; 1 to 10 weight % of MgO; 10 to 20 weight % of F; and 1 to 5 weight % of $LiO_2$; the powder being prepared by once melting the blended components, solidifying the melt, and crushing it into the powder to adjust the average grain diameter of the powder to be equal to or smaller than 10 $\mu$m, 0.1 to 10 weight % of graphite mixed into the powder to provide a mixture, the graphite having the same grain diameter with the powder, and 0.5 to 10 weight % of water glass; a viscosity increasing material; and water; each being added into the mixture so as to adjust the viscosity of the material to a predetermined value, as well as a belt coating method.

The viscosity of the coating material of the present invention is preferably in the range of 500 centipoise to 3,000 centipoise. Further, the melting point of the powder used in the coating material of the present invention is desirably in the range of 700° C. to 1,100° C.

If the coating material of the present invention has been applied onto belt surfaces, the powder to be vitrified does melt when the coating material on the belt surfaces contacts with the molten steel, and the intermediate (mainly alumina) between the cast slab and coating material is adsorbed by the molten vitrification.

The added graphite may either remain as it is, or react with oxygen in the molten steel or in the powder to be vitrified so as to generate a gas (CO or $CO_2$) which forms a heat-resistant layer to reduce the heat conduction between the molten steel (shell layer) and the belts. By the reduction of heat conduction, the average heat flux is also reduced, so that distortion of the slab where it solidifies is reduced, and cracking of the slab is avoided.

The following effects can be achieved, since the coating material of the present invention is prepared in such a way that it comprises a powder having a composition comprising 10 to 40 weight % of $SiO_2$; 1 to 10 weight % of $Al_2O_3$; 10 to 40 weight % of CaO; 10 to 30 weight % of $Na_2O$; 1 to 10 weight % of MgO; 10 to 20 weight % of F; and 1 to 5 weight % of $LiO_2$; the powder being prepared by once melting the blended components, solidifying the melt, and crushing it into the powder to adjust the average grain diameter of the powder to be equal to or smaller than 10 $\mu$m, 0.1 to 10 weight % of graphite mixed into the powder to provide a mixture, wherein the above weight % values are against the total weight of the mixture the graphite having the same grain diameter with the powder, and 0.5 to 10 weight % of water glass with respect to the weight of the mixture; a viscosity increasing material; and water; each being added into the mixture.

Namely, the heat conduction between the molten steel and the belts is reduced by the heat-resistant layer which is formed by the molten coating material when the coating material on the belt surfaces contact with the molten steel, so that the average heat flux is reduced and the cracking of slab surface can be avoided, leading to an improvement in cast slab quality.

When the viscosity of coating material of the present invention is in the range of 500 centipoise to 3,000 centipoise, the coating material is effectively prevented from dripping from the belt surfaces, and the predetermined thickness of material application is effectively and uniformly attained.

Further, when the melting point of the powder used in the coating material of the present invention is in the range of 700° C. to 1,100° C., the melting of the powder to be vitrified in the coating material is smoothly progressed to form a heat-resistant layer.

DETAILED DESCRIPTION OF THE PREFERRED EMBODIMENTS

Figure 2:
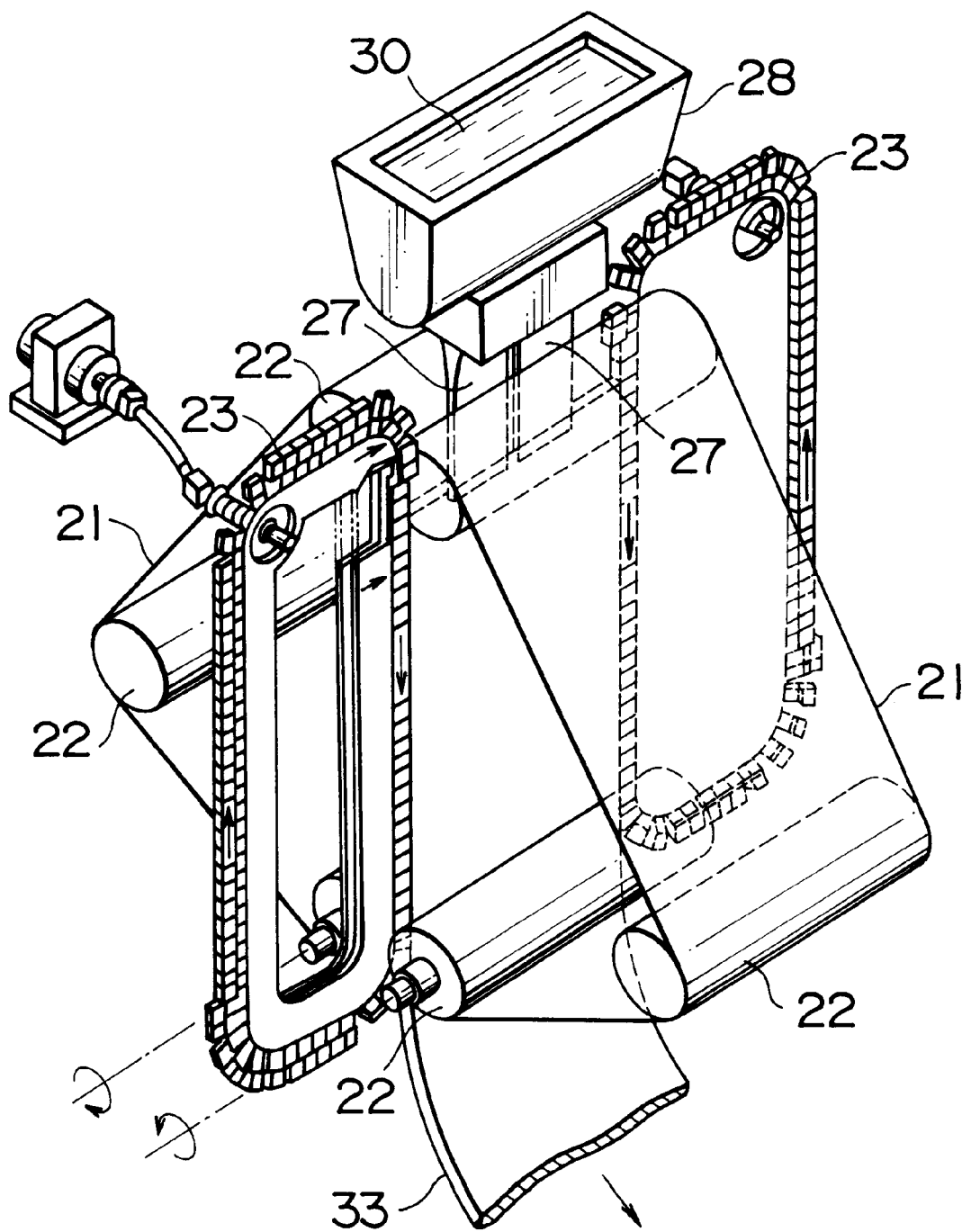
FIG. 2 is an explanatory perspective view of the conventional belt type continuous casting device.
Figure 3:
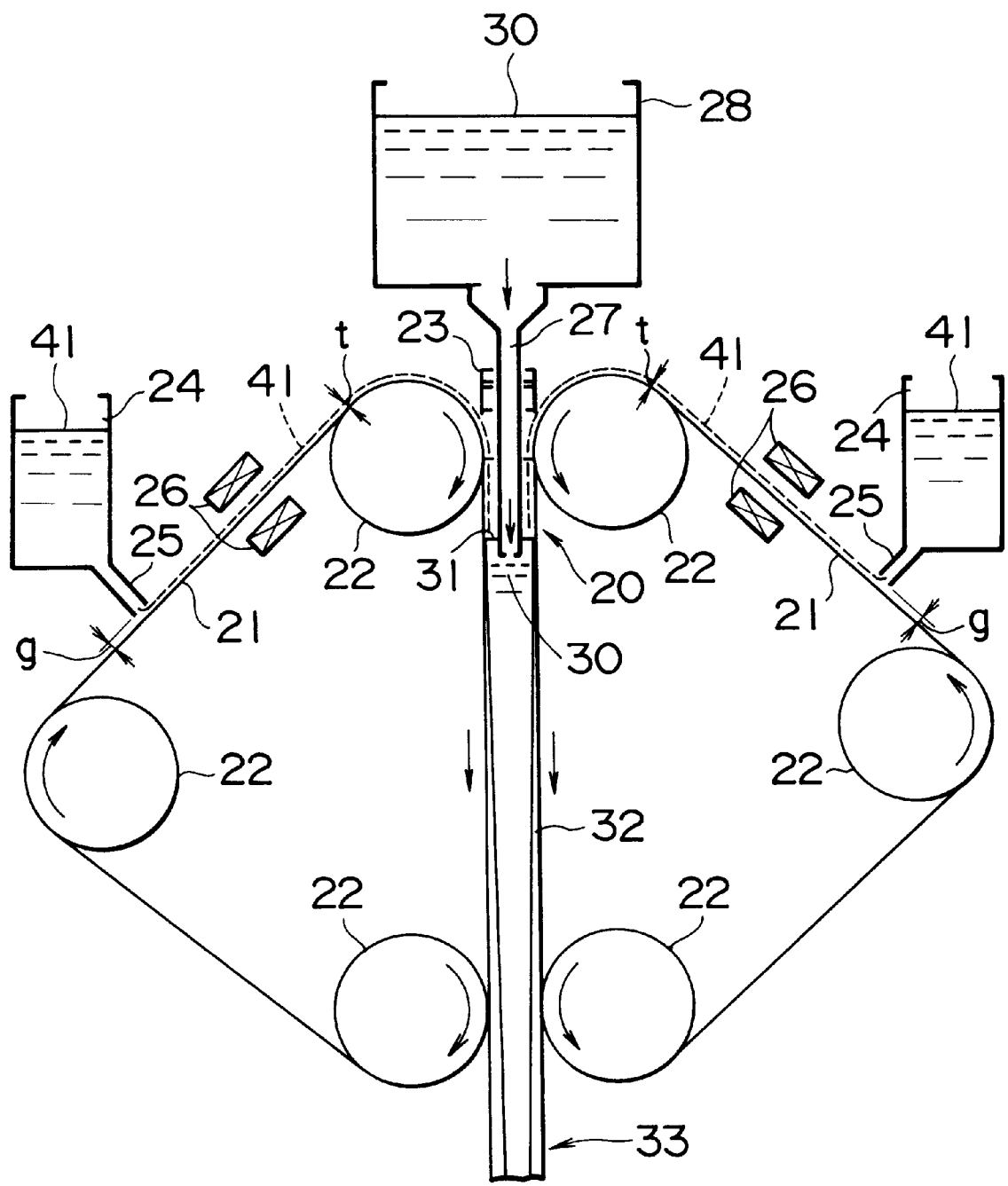
FIG. 3 is a side view for showing a schematic construction of the conventional casting device in which the conventional coating material is used.

The coating material according to the embodiment of the present invention will be described below, in which the cast slab is produced by the belt type continuous casting device shown in FIG. 1. For simplifying the explanation, the same reference numerals are used in FIG. 1 for those parts which are constructed in the same manner as the device shown in FIGS. 2 and 3.

Figure 1:
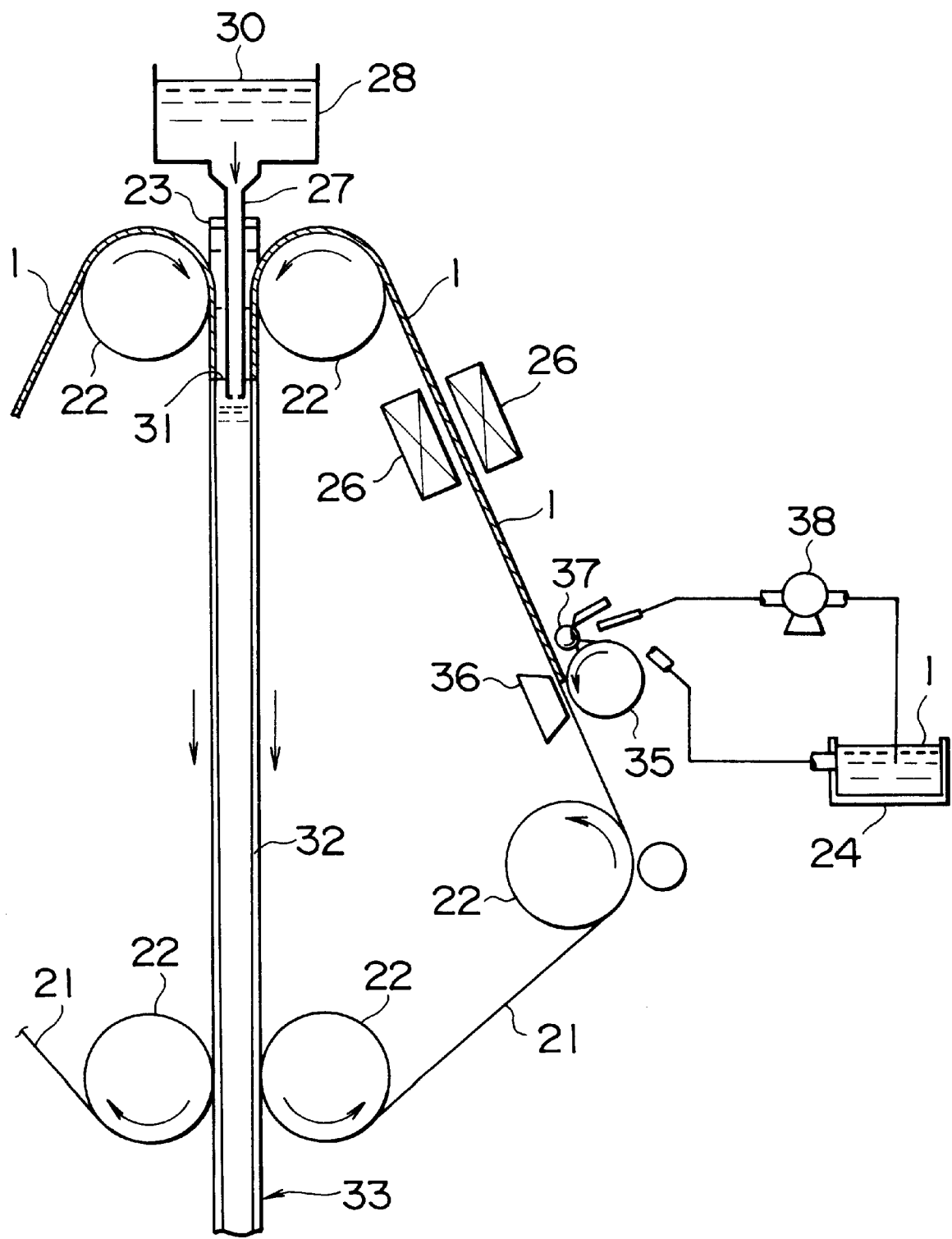
FIG. 1 is a side view for showing a schematic construction of the belt type continuous casting device in which the continuous casting is performed by utilizing the coating material according to the embodiment of the present invention.

In FIG. 1, designated at reference numeral 1 is the coating material according to the present invention. While the belts 21, pulleys 22 and side dams 23 are rotated, the coating device 24 supplies the material 1 onto the coating roll 35 which rotates in a direction counter to the feeding direction of belt 21. The material 1 is then applied at a thickness of 120 $\mu$m onto the surface of belt 21 by the roll 35.

In the roll type coating means shown in FIG. 1, the coating material 1 in the coating device 24 is supplied via a pump 38 into a space defined by the coating roll 35 and an adjusting roll 37 which rotates in the direction to scoop or roll up the material 1. The coating amount of material 1 is adjusted in accordance with the number of revolutions of roll 37 so as to determine the material thickness to be applied onto the belt 21. The back side of belt 21 is supported by a backup plate 36.

The coating material 1 applied onto the belt 21 is heated to dryness by the induction heating coil 26, and then fed upwardly. The dried material 1 will melt when contacting with the molten steel 30 which is continuously supplied from the tundish 28 via the injection nozzle 27 into the molding part 20. The molten steel 30 is downwardly discharged to produce the cast slab 33 having the solidified shell 32 formed by cooling.

The coating material 1, which is applied by coating roll 35 onto the surface of belt 21, contains solid components ($SiO_2$, $Al_2O_3$, CaO, $Na_2O$, MgO, F (added in the form of CaF or NaF), and $LiO_2$) the grain diameters of which are adjusted to be equal to or smaller than 10 $\mu$m since these diameters are required to be within such a tolerance ($\pm 10\ \mu$m) that the coating thickness is to become 120 $\mu$m$\pm 10\ \mu$m.

The coating material 1 in this embodiment is prepared by, mixing or compounding the solid components together to provide a mixture having a composition of 30 weight % of $SiO_2$, 6 weight % of $Al_2O_3$, 22 weight % of CaO, 21 weights of $Na_2O$, 4 weight % of MgO, 13 weight % of F (added in the form of CaF), and 2 weight % of $LiO_2$, melting the mixture once, solidifying the melt, and crushing it into a powder having an average grain diameter equal to or smaller than 10 $\mu$m.

A graphite having the grain diameters equal to or smaller than that of the powder is mixed into the powder, so as to provide a further mixture. Into this mixture is added 4 weight % of water glass, an organic material (carboxymethylcellulose) for increasing viscosity, and water, so as to eventually provide a pasty coating material having a viscosity of 1,000 centipoise.

This viscosity is typically adjusted into the range of 500 centipoise to 3,000 centipoise, since the coating material may drip from the belt surfaces if the viscosity is smaller than 500 centipoise, and since the coating material could not be supplied from the coating roll 35 into a uniform film state or the coating itself could not be effected if greater than 3,000 centipoise.

The mixed components of the coating material 1 have been selected under the condition that the material:

(1) melts by the radiant heat (approximately $16 \times 10^4$ kcal/m$^2$·hr) from the molten steel just above the meniscus 31,
(2) has their melting point of 900° C.
(3) can retain such a viscosity that it does not drip when vitrified, and
(4) can retain a heat flux of $200 \times 10^4$ kcal/m$^2$·hr, at a thickness greater than 100 $\mu$m.

The lower limit of the melting point is 700° C., since the radiant heat from nozzle 27 (its surface temperature is 800° C.) will cause the melting of the mixed oxides if the melting point is lower than 700° C. The upper limit is 1,100° C., since the temperature of slab surface within the mold is higher than this 1,100° C.

The reference value of $200 \times 10^4$ kcal/m$^2$·hr for the average heat flux is determined based on the experimental value which is obtained from a test result as to whether. cracking is caused in the slab when a copper block is immersed into the molten steel.

If the amount of $SiO_2$ in the material 1 is less than 10 weight %, the adsorbability of the mixed oxides for alumina (ability of molten coating material for forming (molten) mixed oxides with alumina within a short period of time) is reduced when the mixed oxides are vitrified. If greater than 40 weight %, the melting point of the mixed oxides becomes higher than 1,100° C., resulting in a reduction of adsorbability for alumina from the slab surfaces within the mold.

If the amount of $Al_2O_3$ is less than 1 weight %, the adsorbability for alumina is reduced when the mixed oxides are vitrified. If greater than 10 weight %, the melting point becomes higher than 1,100° C. resulting in reduction of adsorbability for alumina from the slab surfaces within the mold.

If the amount of CaO is less than 10 weight %, the adsorbability for alumina is reduced when the mixed oxides are vitrified. If greater than 40 weight %, the melting point becomes higher than 1,100° C. resulting in reduction of adsorbability for alumina from the slab surfaces within the mold.

If the amount of $Na_2O$ is less than 10 weight %, the adsorbability for alumina is reduced when the mixed oxides are vitrified. If greater than 30 weight %, the mixed oxides are too vitrified to retain an average heat flux of less than $200 \times 10^4$ kcal/m$^2$hr.

If the amount of MgO is less than 1 weight %, the adsorbability for alumina is reduced when the mixed oxides are vitrified. If greater than 10 weight %, the mixed oxides become too vitrified to retain an average heat flux of less than $200 \times 10^4$ kcal/m$^2$·hr.

If the amount of F is less than 10 weight %, the vitrification of the mixed oxides is not promoted. If greater than 20 weight %, such vitrification is too promoted to retain an average heat flux of less than $200 \times 10^4$ kcal/m$^2$·hr.

If the amount of LiO$_2$ is less than 1 weight %, the melting point becomes higher than 1,100° C. resulting in that the mixed oxides do not vitrify in short periods of time when they come into contact with the molten steel. If greater than 5 weight %, the viscosity becomes so small that even after the vitrification the material does not remain as a film but drips before contacting the molten steel.

If the amount of graphite is less than 0.1 weight %, an average heat flux of less than $200 \times 10^4$ kcal/m$^2$·hr could not be retained even when the coating thickness is increased. If greater than 10 weight %, the vitrification of mixed oxides is considerably hindered.

If the amount of water glass is less than 0.5 weight %, the material 1 will separate from the belt due to smaller binding force between them after the material 1 is dried. If greater than 10 weight %, there occurs such bubbling (cause of gas generation) that the casting becomes impossible when the dried material 1 contacts the molten steel.

As a test example, the coating material 1 (30 weight % of SiO$_2$, 6 weight % of Al$_2$O$_3$, 22 weight % of CaO, 20 weight % of Na$_2$O, 15 weights of F, 4 weight of MgO, 1 weight % of LiO$_2$, and 2 weight % of graphite) has been applied onto the belt under the condition as shown in the following table 1.

TABLE 1

| | |
|---|---|
| sectional size of cast slab: | 75 mm × 1,200 mm; |
| class of slab: | medium carbon steel (0.13% C); |
| rate of casting: | 10 m/min.; and |
| thickness of coating: | 120 μm. |

According to this test, it is observed that the average heat flux is $180 \times 10^4$ kcal/m$^2$·hr in the region within 450 mm below the meniscus 31, and no cracks have occurred in the slab surfaces even when the medium carbon steel of 0.13% C is produced by casting.

As the molten steel 30 is injected from the upper inlet of molding part while the coating material 1 of the present invention is applied onto the belt 21 which is then lowered to define the molding part, the injected molten steel 30 is moved down along the taper of molding part toward the lower outlet for slab.

In the above, the powder to be vitrified does melt when the coating material 1 on the belt surfaces contacts with the molten steel 30, but the added graphite may either remain as it is or react with oxygen in the molten steel or in the powder to be vitrified to generate a gas (CO or CO$_2$) which forms a heat-resistant layer to reduce the heat conduction. As a result, the average heat flux in the region within 450 mm below the meniscus 31 is reduced, and no cracks occur in the surfaces of the produced slab.

As described above, graphite is added into the powder to be vitrified according to the present invention, so that the average heat flux is reduced and no cracking occur in the surfaces of the produced slab, effectively leading to improved slab quality and enhanced productivity.

Although what has been described is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed is:

1. A belt coating material for a belt type continuous casting, comprising
    (1) a powder having a composition comprising
        10 to 40 weight % of SiO$_2$,
        1 to 10 weight % of Al$_2$O$_3$,
        10 to 40 weight % of CaO,
        10 to 30 weight % of Na$_2$O,
        1 to 10 weight % of MgO,
        10 to 20 weight % of F, and
        1 to 5 weight % of LiO$_2$,
    with said powder having an average grain diameter of 10 μm or less;
    (2) 0.1 to 10 weight % of graphite, said graphite having substantially the same grain diameter as that of said powder, wherein the above weight % values are measured against the total weight of a mixture of said graphite and said powder;
    (3) 0.5 to 10 weight % of water glass with respect to the weight of the mixture of the powder and graphite;
    (4) a viscosity increasing material; and
    (5) water.

2. A belt coating material according to claim 1, wherein said powder is prepared by once melting the blended components, solidifying the melt, and crushing it into said powder to adjust the average grain diameter of said powder to be equal to or smaller than 10 μm, and wherein said water glass, said viscosity increasing material and said water are added into said mixture so as to adjust the viscosity of said material.

3. A belt coating material according to claim 1, wherein said viscosity is in the range of 500 centipoise to 3,000 centipoise.

4. A belt coating material according to claim 1, wherein the melting point of said powder is in the range of 700° C. to 1,100° C.

* * * * *

UNITED STATES PATENT AND TRADEMARK OFFICE
CERTIFICATE OF CORRECTION

PATENT NO. : 5,900,052
DATED : May 4, 1999
INVENTOR(S) : Nakajima et al.

It is certified that error appears in the above-identified patent and that said Letters Patent is hereby corrected as shown below:

Title page, item [56], in the References Cited, FOREIGN PATENT DOCUMENTS, "06116408" should read --06226408--.

Signed and Sealed this

Twelfth Day of October, 1999

Q. TODD DICKINSON

*Attest:*

*Attesting Officer*     *Acting Commissioner of Patents and Trademarks*